US008855884B1

United States Patent
Fujitsuka (10) Patent No.: US 8,855,884 B1
(45) Date of Patent: Oct. 7, 2014

(54) OCCUPANT PROTECTION SYSTEM (71) Applicant: Denso Corporation, Kariya (JP)

(72) Inventor: Hiroshi Fujitsuka, Seto (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/294,523

(22) Filed: Jun. 3, 2014

(30) Foreign Application Priority Data

Jun. 6, 2013 (JP) .................................. 2013-119713

(51) Int. Cl.
*G06F 19/00* (2011.01)
*B60R 21/0136* (2006.01)
*B60R 21/015* (2006.01)
*B60R 21/013* (2006.01)

(52) U.S. Cl.
CPC ... *B60R 21/0136* (2013.01); *B60R 2021/01315* (2013.01); *B60R 21/015* (2013.01)
USPC ............... 701/70; 701/45; 180/271; 180/282; 280/735; 297/216.1

(58) Field of Classification Search
CPC ............. B60N 2/0276; B60M 2/42745; B60R 21/015; B60R 21/0134
USPC ............ 701/45, 70; 180/271, 282; 279/216.1; 280/735

See application file for complete search history.

(56) References Cited

U.S. PATENT DOCUMENTS

| 7,108,280 | B2 * | 9/2006 | Abe ............................. 280/734 |
| 7,931,332 | B2 * | 4/2011 | Andou et al. ............ 297/216.13 |
| 8,059,867 | B2 * | 11/2011 | Aoki ............................. 382/104 |
| 8,630,772 | B2 * | 1/2014 | Ieda et al. ....................... 701/45 |
| 2006/0138759 | A1 * | 6/2006 | Aoki et al. .................... 280/735 |
| 2006/0186651 | A1 * | 8/2006 | Aoki ............................. 280/735 |
| 2009/0140559 | A1 * | 6/2009 | Andou et al. .............. 297/216.1 |
| 2011/0035116 | A1 * | 2/2011 | Ieda et al. ....................... 701/45 |
| 2011/0074190 | A1 * | 3/2011 | Hashimoto ................ 297/216.1 |
| 2011/0098893 | A1 * | 4/2011 | Hashimoto ..................... 701/46 |
| 2011/0221247 | A1 * | 9/2011 | Hashimoto et al. ...... 297/216.13 |

FOREIGN PATENT DOCUMENTS

JP   2005-280380   10/2005

* cited by examiner

*Primary Examiner* — McDieunel Marc
(74) *Attorney, Agent, or Firm* — Harness, Dickey & Pierce, PLC (57) ABSTRACT

An occupant protection system is provided. The occupant protection system includes a sensor for detecting an impact at a time of collision, a determination device for determining the collision based on a detection signal of the sensor, and a an occupant state detection device for detecting whether an occupant's posture is maintainable. When the occupant's posture is maintainable after a primary-collision, the determination device determines a secondary-collision by comparing the detection signal of the sensor with a first threshold. When the occupant's posture is not maintainable after the primary collision, the determination device determines the secondary-collision by comparing the detection signal of the sensor with a second threshold smaller than the first threshold.

6 Claims, 6 Drawing Sheets

OCCUPANT PROTECTION SYSTEM

CROSS REFERENCE TO RELATED APPLICATION

The present application is based on Japanese Patent Application No. 2013-119713 filed on Jun. 6, 2013, disclosure of which is incorporated herein by reference.

TECHNICAL FIELD

The present disclosure relates to an occupant protection system for protecting an occupant in a vehicle at a time of vehicle collision. In particular, the present disclosure relates to an occupant protection system for protecting an occupant in successive two collisions.

BACKGROUND

Some vehicles are provided with an occupant protection system for protecting an occupant at a time of vehicle collision. For example, an occupant protection system deploys an airbag at collision to protect an occupant. Recently, there is a demand that an occupant protection system protects an occupant against not only a primary collision of a vehicle but also a secondary collision. The secondary collision is the collision with another object after the primary collision (first collision) and the irregular movement of the vehicle resulting from the impact of the primary collision.

JP-2005-280380A discloses a conventional occupant protection system. In the system, acceleration of a side part of a vehicle after the rotation of the vehicle due to the collision (primary collision) is detected with a yaw rate sensor, so that the side collision occurring as the secondary collision is detected based on the detected yaw rate.

The inventor of the present application believes that in an occupant protection system, it is required to further reduce damage of an occupant suffered at a time of the secondary collision. In particular, in the secondary collision, a vehicle side collision may occur during rotation of the vehicle and the occupant may be unstable in the rotating vehicle. In this case, the occupant moves in conjunction with the rotation of the vehicle and easily collides with an inner surface of a vehicle cabin. The collision with the inner surface of the vehicle cabin may result in a large damage of the occupant.

SUMMARY

In view of the foregoing, it is an object of the present disclosure to provide an occupant protection system that can reduce damage of an occupant suffered in a secondary collision.

The inventor of the present application reveals the above object can be achieved by an occupant protection system that is provided with an occupant state detection device for detecting whether a posture of an occupant of the vehicle is maintainable after a primary collision. When the occupant state detection device detects that the posture of the occupant of the vehicle is maintainable after the primary collision, a smaller determination threshold is used to determine the secondary collision.

Specifically, according to an example of the present disclosure, an occupant protection system comprises a sensor, a determination device and an occupant state detection device. The sensor detects an impact at a time of collision of a vehicle. The collision of the vehicle includes a primary-collision and a secondary-collision occurring due to movement of the vehicle resulting from the primary-collision. The determination device determines the primary-collision by comparing a detection signal of the sensor with a primary-collision determination threshold. The occupant state detection device detects whether a posture of an occupant of the vehicle is maintainable. For the secondary-collision occurring due to the movement of the vehicle resulting from the primary-collision, the determination device determines the secondary-collision. When the occupant state detection device detects that the posture of the occupant is maintainable after the determination device determines that the primary-collision has occurred, the determination device determines the secondary-collision by comparing the detection signal of the sensor with a first secondary-collision determination threshold. When the occupant state detection device detects that the posture of the occupant is not maintainable after the determination device determines that the primary-collision has occurred, the determination device determines the secondary-collision by comparing the detection signal of the sensor with a second secondary-collision determination threshold smaller than the first secondary-collision determination threshold.

In the above occupant protection system, when the occupant state detection device determines that the posture of the occupant is maintainable, the first secondary-collision determination threshold is used to determine the secondary collision. When the occupant state detection device determines that the posture of the occupant is not maintainable, the second secondary-collision determination threshold smaller than the first secondary-collision determination threshold is used to determine the secondary collision. This second secondary-collision determination threshold facilitates completion of the collision determination and shortens the time to complete the collision determination. As a result, in case of secondary collision, the protection of the occupant can be quickly started. That is, even when the occupant has difficulty responding to the secondary collision, the occupant protection system can start the occupant protection within a short time period from the occurrence of the secondary collision.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be illustrated. It is noted the below-illustrated embodiments are merely examples and do not limit embodiments of the present disclosure. As one embodiment, explanation is given on collision detection in a vehicle protection system for protecting an occupant in a vehicle.

First Embodiment

Figure 1:
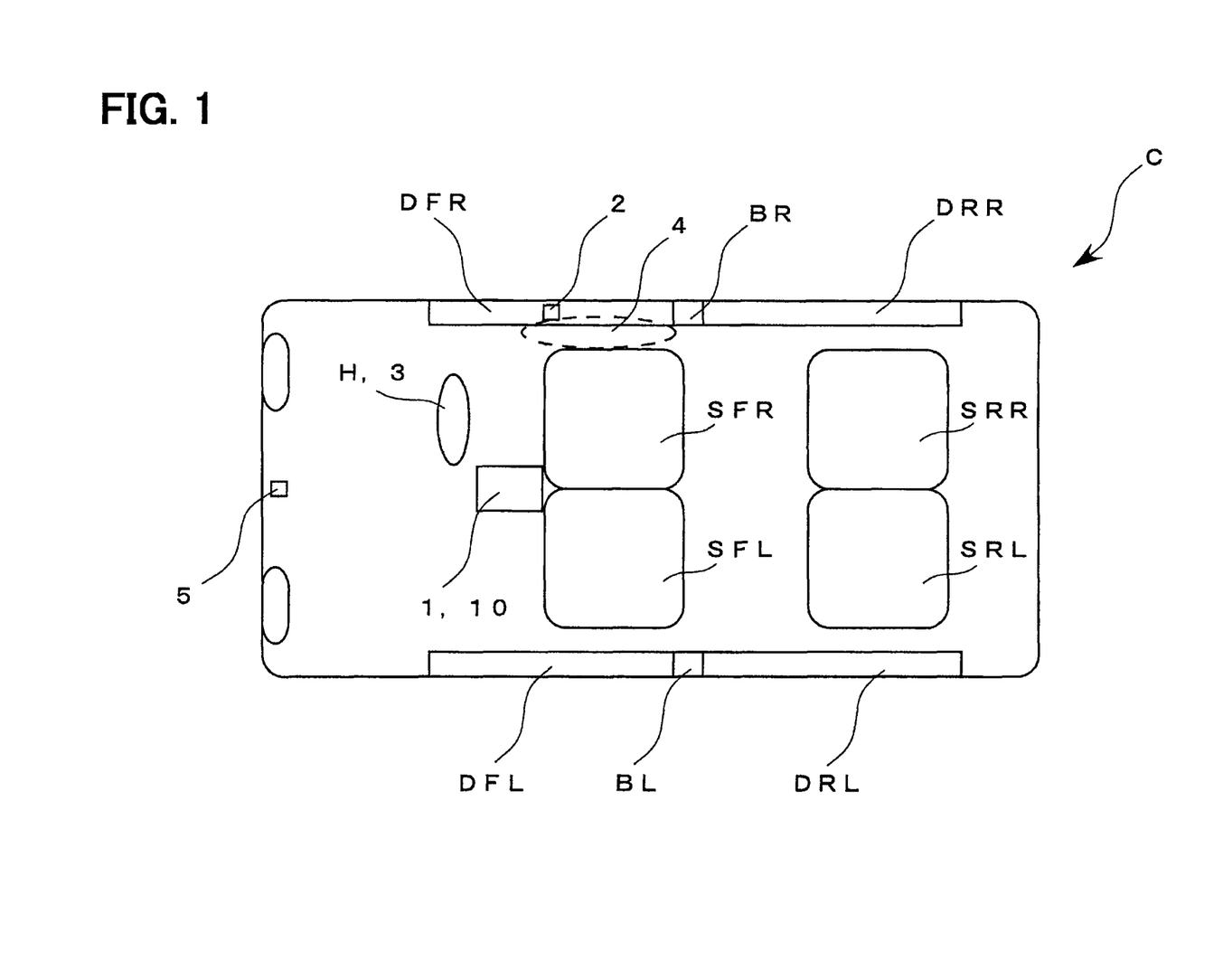
FIG. 1 is a diagram schematically illustrating a vehicle mounted with an occupant protection system of a first embodiment.

The present embodiment is directed to an occupant protection system mounted on to a vehicle C (vehicle cabin), as shown in FIG. 1.

As shown in FIG. 1, the vehicle C has occupant two seats on a vehicle front side and two occupant seats on a vehicle rear side, so that two seas are arranged in a vehicle width direction. Doors D are present in vicinity of respective seats to correspond to the seats. Specifically, the vehicle C has four seats, which are a front right seat SFR, a front left seat SFL, a rear right seat SRR, and a rear left seat SRL. The vehicle C has four doors D, which are a front right door DFR, a front left door DFL, a rear right door DRR, and a rear left door DRL. A pillar BR is provided between the front right door DFR and the rear right door DRR. A pillar BL is provided between the front left door DFL and the rear left door DRL.

The occupant protection system of the present embodiment includes an electronic control unit (ECU) 1, a satellite sensor 2, a steering wheel touch sensor 3, a side airbag 4 and an acceleration sensor 5. The satellite sensor 2, the steering wheel touch sensor 3 and the side airbag 4 are connected to the ECU 1 via a communication line (not shown).

The ECU 1 is arranged at substantially the center of the vehicle C. The ECU 1 determines a collision of the vehicle C (specifically, the collision necessitating protection of the occupant) and controls startup of the side airbag 4. The ECU 1 is provided with a safing sensor 10 for detecting the impact on the vehicle and for ensuring redundancy to each sensor 2, 5. The ECU 1 corresponds to a determination device. The sensor 2, 5 corresponds to a main sensor.

The ECU 1 makes the collision determination by comparing a detection signal of each sensor 2, 5, 10 with a determination threshold. Specifically, a detection signal of each sensor 2, 5 is processed. Specifically, in the present embodiment, a detection signal of each sensor 2, 5 is integrated. When a processed value such as an integrated value exceeds the determination threshold, The ECU 1 determines the collision.

As determination thresholds for determining successive two collisions (i.e., primary collision and secondary collision), the ECU 1 stores a determination threshold used for determining the primary collision, and a determination threshold used for determining the secondary collision. The determination threshold used for determining the primary collision is called herein a primary-collision determination threshold. The determination threshold used for determining the secondary collision is called herein a secondary-collision determination threshold, which includes a first secondary-collision determination and a second secondary-collision determination thresholds smaller than the first secondary-collision determination threshold.

Each of the primary-collision determination threshold, the first secondary-collision determination threshold, and the second secondary-collision determination threshold generically includes determination thresholds corresponding to the detection signals of the satellite sensors 2, 5 and the safing sensor 10. That is, the primary-collision determination threshold has multiple determination thresholds for the determinations using the sensors 2, 5, 10, respectively. For example, the primary-collision determination threshold has a determination threshold for the determination using the sensor 5 and a determination threshold for the determination using the sensor 10. The first secondary-collision determination threshold has a determination threshold for the determination using the sensor 2 and a determination threshold for the determination using the sensor 10. The second secondary-collision determination threshold has a determination threshold for the determination using the sensor 2 and a determination threshold for the determination using the sensor 10.

With reference to a detection result of the steering wheel touch sensor 3, the ECU 1 sets the determination thresholds used in determining the secondary-collision. Specifically, after occurrence of the primary collision of the vehicle C, the ECU 1 determines based on the detection result of the steering wheel touch sensor 3 whether the steering wheel H is gripped. When the steering wheel H is gripped by the occupant, the ECU 1 uses the first secondary-collision determination threshold to determine the secondary collision. When the steering wheel H is not gripped by the occupant, the ECU 1 uses the second secondary-collision determination threshold to determine the secondary collision.

When the integrated value at the time of the secondary collision exceeds the first or second secondary-collision determination threshold, the ECU 1 determines that the occupant should be protected, and the ECU 1 issues a start-up signal to start up the side airbag 4. The satellite sensor 2 is provided at the center of the front right door DFR of the vehicle C and detects an impact in the vehicle width direction.

Figure 2:
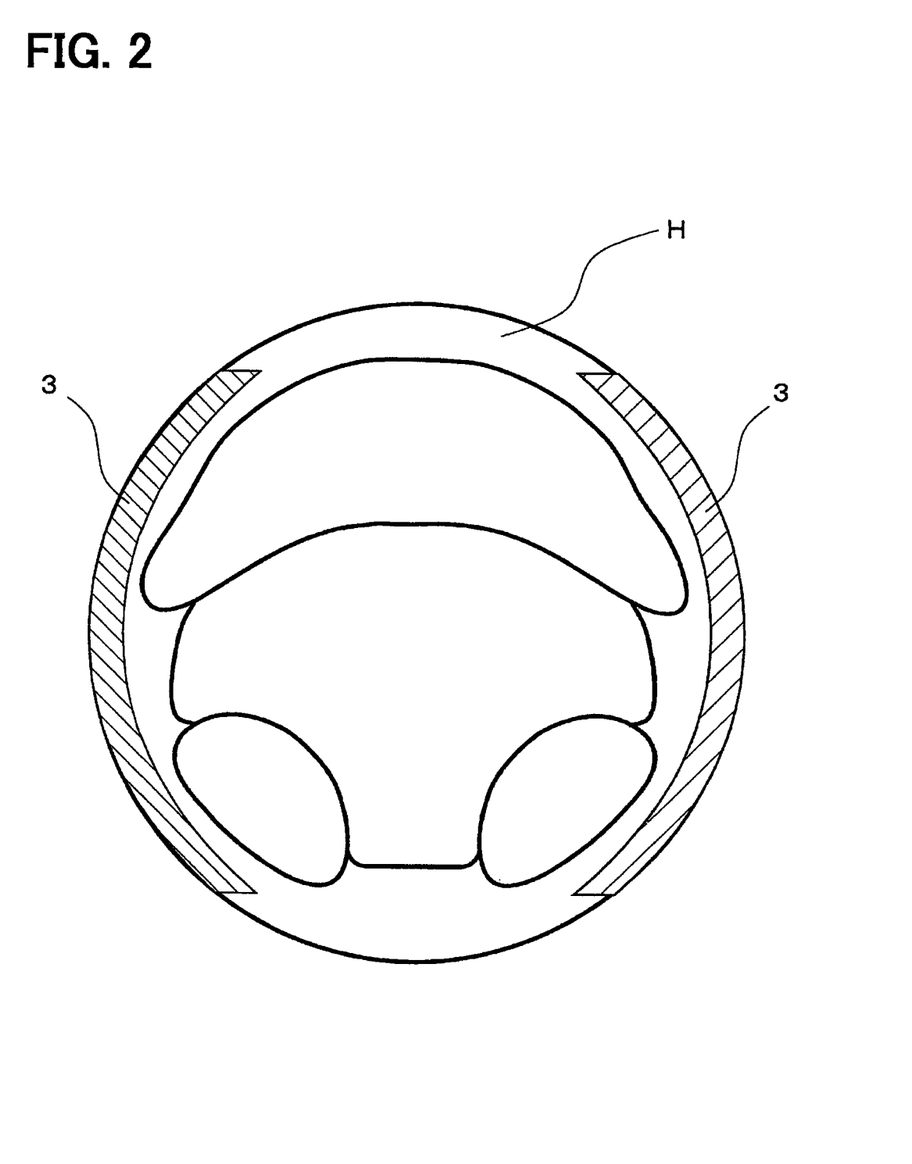
FIG. 2 is a diagram illustrating a steering wheel mounted with a steering wheel touch sensor.

As shown in FIG. 2, the steering wheel touch sensor 3 is provided on the steering wheel H of the vehicle C and detects whether or the steering wheel H is gripped by the occupant. In the present embodiment, an electrostatic capacitive sensor is used as the steering wheel touch sensor 3. In the present embodiment, as shown in FIG. 1, the steering wheel H of the vehicle C is to be gripped by the occupant (driver) seated on the front right seat SFR. The steering wheel touch sensor 3 corresponds to an occupant state detection device.

The side airbag 4 is provided in a right side part of the vehicle to protect the occupant on the front right seat SFR. The side airbag 4 operates (starts up) in response to the startup signal from the ECU 1. The acceleration sensor 5 is provided in a front part of the vehicle C (e.g., substantially the center of the front part) to detect the impact in a vehicle heading direction and a vehicle backing direction (vehicle front direction and vehicle rear direction).

The vehicle C and the occupant protection system include other devices for protecting the occupant such as sensors (not shown), airbag and the like.

(Operation of Occupant Protection System)

Explanation is given on an example of operation when the primary collision occurs at a left front portion of the vehicle C and thereafter the secondary collision occurs. The secondary collision refers to next collision after the vehicle is moved due to the occurrence of the primary collision. The secondary collision occurs within a specific time period after the primary collision. The specific time period is a predetermined short time period immediately after the primary collision.

Figure 3:
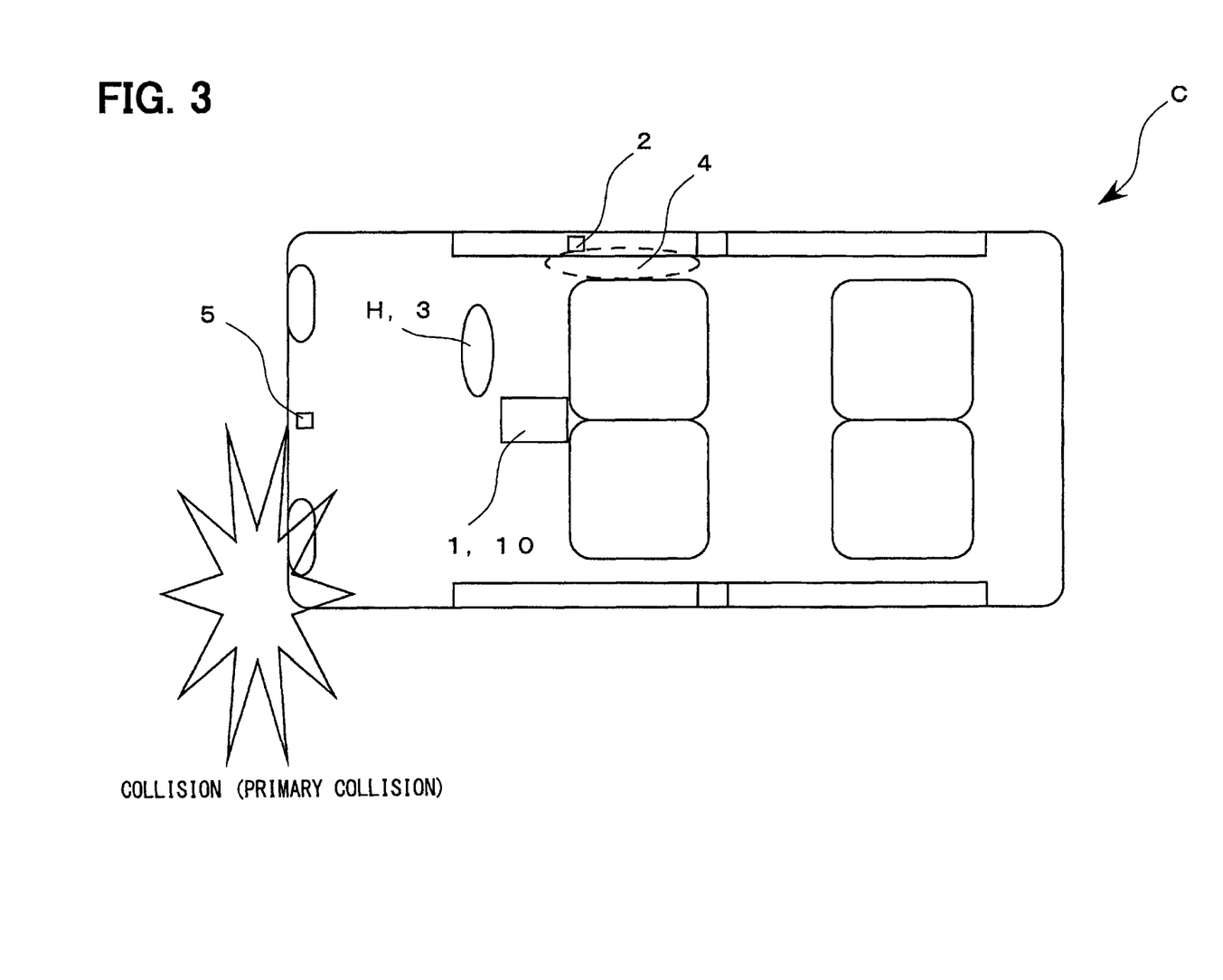
FIG. 3 is a diagram illustrating a primary collision of a vehicle of a first embodiment.
Figure 4:
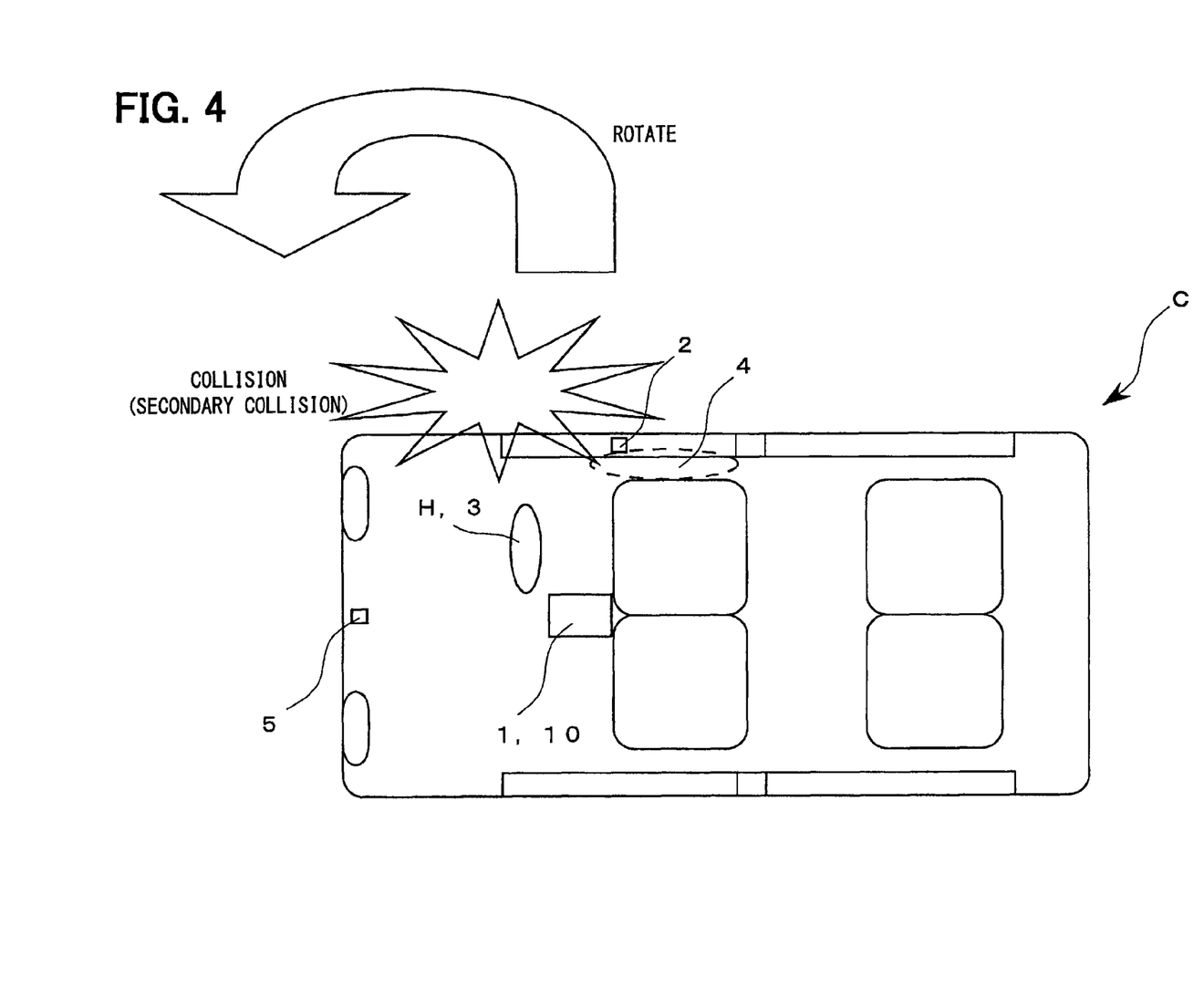
FIG. 4 is a diagram illustrating a secondary collision of a vehicle of a first embodiment.
Figure 5:
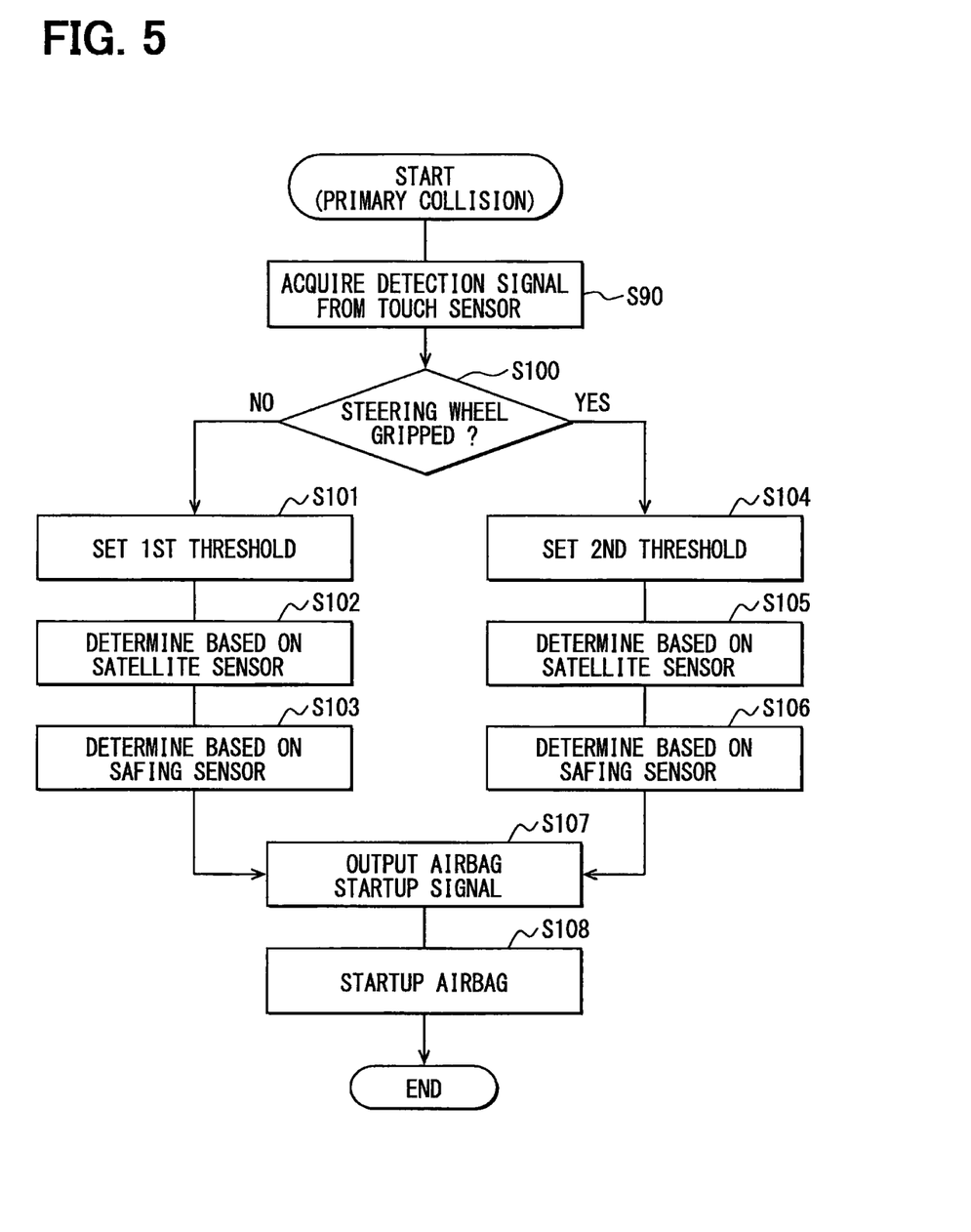
FIG. 5 is a diagram illustrating a collision determination manner of an occupant protection system of a first embodiment.

In the collision illustrated in FIG. 3, first, the primary collision occurs at the front left portion of the vehicle C, and then the impact of the primary collision rotates the vehicle C. Thereafter, as illustrated in FIG. 4, the secondary collision, which is another new collision, occurs at a right side of the vehicle. It is noted that in the present embodiment, the detection signal of each sensor 2, 3, 5, 10 is inputted to the ECU 1 at predetermined intervals (e.g., 0.5 milliseconds interval). FIG. 5 illustrates a flow of collision determination of the present embodiment.

(Primary Collision)

As shown in FIG. 3, assume that the primary collision occurs at the front left portion of the vehicle C. When the primary collision occurs, the acceleration sensor 5 and the safing sensor 10 detect the collision and transmit their detection results to the ECU 1.

When ECU 1 receives the detection results of the two sensors 5 and 10, the ECU 1 compares the integrated values, which are calculated from the detection results of respective sensors 5 and 10, with the primary collision determination thresholds. When both of the two integrated values exceed the primary collision determination thresholds, the ECU 1 places the device (not shown) in operation and thereby protects the driver (occupant). In this collision, the determination of the primary collision and the protection of the occupant can be performed in substantially the same manner as in a conventional occupant protection system.

(Steering Wheel Gripping Determination)

After the ECU 1 determines the primary collision, the ECU 1 refers the inputted detection signal of the steering wheel touch sensor 3.

When the ECU 1 determines based on the detection signal of the steering wheel touch sensor 3 that the steering wheel H is gripped by the driver, the ECU 1 determines that a posture of the driver is maintainable. Specifically, the ECU 1 determines that the vehicle C is operable by the driver. In this case, the ECU 1 sets the first secondary-collision determination threshold as a next-used secondary-collision determination threshold.

When the ECU 1 determines that the steering wheel H is not gripped by the driver, the ECU 1 determines that a posture of the driver is not maintainable. Specifically, the ECU 1 determines that the vehicle C is not operable by the driver. In this case, the ECU 1 sets the second secondary-collision determination threshold as a next-used secondary-collision determination threshold.

(Secondary Collision)

As shown in FIG. 4, after the primary collision, the vehicle C may rotate counter clockwise. In this case, due to the rotation of the vehicle C, the right side of the vehicle C in the rotation direction may collide (secondary collision) with another object.

(Steering Wheel Gripped Case)

After determining the primary collision, the ECU 1 may determine based on the detection signal of the steering wheel touch sensor 3 that the steering wheel H is gripped by the driver. In this case, the ECU 1 sets the first secondary-collision determination threshold as the determination threshold for determining the secondary collision.

Thereafter, the secondary collision occurs and the sensors 2 and 10 detect the impact of the secondary collision. The detection results of the sensors 2, 10 are inputted to the ECU 1 and the ECU 1 makes the collision determination by using the first secondary-collision determination threshold in a manner similar to that in the primary collision.

Specifically, when the ECU 1 receives the detection results of the two sensors 2 and 10, the ECU 1 compares the integrated values, which are calculated from respective detection results, with the first secondary-collision determination thresholds. When both of the two integrated values exceed the first secondary-collision determination thresholds, the ECU 1 determines that the occupant should be protected, and the ECU 1 issues a startup signal to start up the side airbag 4. Upon receipt of the startup signal, the side airbag 4 starts up and protects the occupant.

(Steering Wheel Non-Gripped Case)

After determining the primary collision, the ECU 1 may determine based on the detection signal of the steering wheel touch sensor 3 that the steering wheel H is not gripped by the driver. In this case, the ECU 1 sets the second secondary-collision determination threshold as the determination threshold for determining the secondary collision.

Thereafter, the secondary collision occurs and the sensors 2 and 10 detect the impact of the secondary collision. The detection results of the sensors 2, 10 are inputted to the ECU 1 and the ECU 1 determines the collision determination by using the second secondary-collision determination threshold in a manner similar to that in the primary collision.

Specifically, when receiving the detection results of the two sensors 2 and 10, the ECU 1 compares the integrated values, which are calculated from respective detection results, with the first secondary-collision determination thresholds. When both of the two integrated values exceed the second secondary-collision determination thresholds, the ECU 1 determines that the occupant should be protected, and the ECU 1 issues a startup signal to start up the side airbag 4. Upon receipt of the startup signal, the side airbag 4 starts up and protects the occupant.

The above operation of the occupant protection system will be specifically illustrated based on a flowchart of FIG. 5. The flow of FIG. 5 starts when the ECU 1 determines the primary collision.

At S90, the ECU 1 acquires the detection result of the steering wheel touch sensor 3. At S100, the ECU 1 determines whether or not the driver is gripping the steering wheel H based on the detection result of the steering wheel touch sensor 3.

When it is determined that the driver is not gripping the steering wheel H, the process proceed to S101. At 101, the ECU 1 sets the second secondary-collision determination threshold as the determination threshold used for determining the secondary collision. At S102 and S103, the ECU 1 determines whether that the occupant should be protected against the secondary collision by comparing the detection results of the sensors 2 and 5 with the second secondary-collision determination thresholds. When the ECU 1 determines at both S102 and S103 that that the occupant should be protected against the secondary collision, the process proceeds to S107. Otherwise, this process is ended.

When it is determined that the driver is gripping the steering wheel H, the process proceed to S104. At 104, the ECU 1 sets the first secondary-collision determination threshold as the determination threshold used for determining the secondary collision. At S105 and S106, the ECU 1 determines whether that the occupant should be protected against the secondary collision by comparing the detection results of the sensors 2 and 5 with the first secondary-collision determination thresholds. When the ECU 1 determines at both S105 and S106 that that the occupant should be protected against the secondary collision, the process proceeds to S107. Otherwise, this process is ended.

At S107, the ECU 1 transmits the startup signal to the airbag 4. At S108, the airbag starts up to protect the occupant.

As described above, when it is determined that the steering wheel H is gripped by the driver after the primary collision, the first secondary-collision determination threshold is used for the collision determination. In this case, the driver cannot maintain his posture, i.e., the driver cannot operate the vehicle C. Thus, the driver can gird himself for the secondary collision or can operate the vehicle to avoid the secondary collision, thereby reducing a damage degree to be suffered.

When it is determined that the steering wheel H is not gripped by the driver after the primary collision, the second secondary-collision determination threshold smaller than the first secondary-collision determination threshold is used for the collision determination. In this case, the driver cannot maintain his posture, i.e., the driver cannot operate vehicle C well. That is, when the driver is in this kind of state, the second secondary-collision determination threshold smaller than the first secondary-collision determination threshold is used for the collision determination. When the second secondary-collision determination threshold is used, the determination of the secondary-collision is completed earlier. As a result, even if the driver cannot gird himself for the secondary collision or cannot operate the vehicle to avoid the secondary collision, a damage degree of the drive is reduced.

Additionally, even when the secondary collision is so small that the use of the first secondary-collision determination threshold cannot determine (identify) the secondary collision, the use of the secondary-collision determination threshold makes it possible to determine that the occupant should be protected. That is, even in a situation where the collision determination using the first secondary-collision determination threshold cannot determine the occurrence of the collision, the airbag 4 starts up to and protects the driver. Therefore, the present embodiment advantageously reduces the damage degree of the driver in the secondary collision occurring within a specific time period from the primary collision. In the present embodiment, because the steering wheel touch sensor 3 provided on the steering wheel of the vehicle C is used to make a determination as to maintainability of the driver's posture, it is possible to not only determine whether the driver can maintain his posture but also determine whether the driver can operate the steering wheel to avoid the secondary collision. Therefore, this advantage reduces the damage degree of the driver.

Second Embodiment

An occupant protection system of the present embodiment is the same as that of the first embodiment, except that the occupant protection system of the present embodiment includes a vehicle speed reduction device 6.

Figure 6:
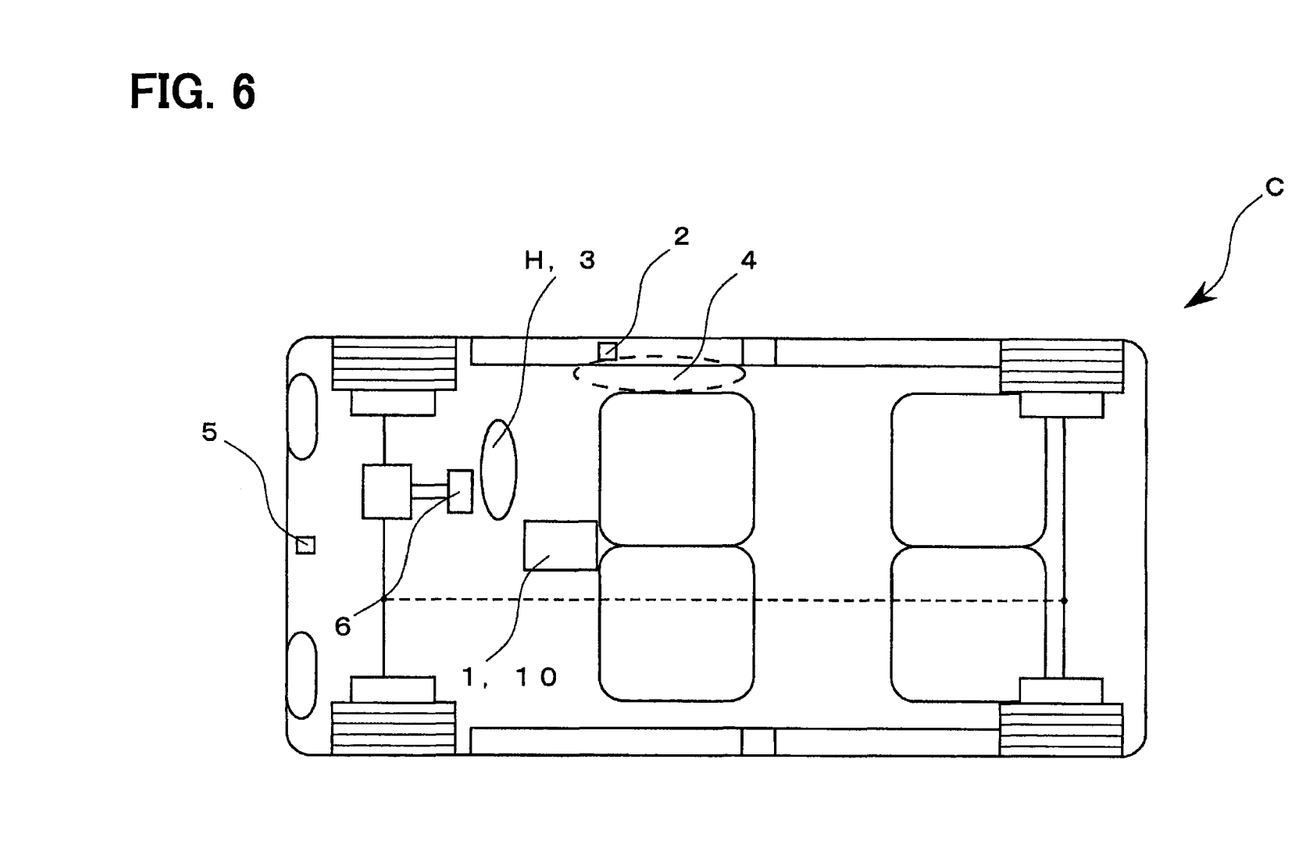
FIG. 6 is a diagram schematically illustrating a vehicle mounted with an occupant protection system of a second embodiment.

As schematically illustrated in FIG. 6, the occupant protection system of the present embodiment includes an electronic control unit (ECU) 1, a satellite sensor 2, a steering wheel touch sensor 3, a side airbag 4, an acceleration sensor 5 and a vehicle speed reduction device 6. The satellite sensor 2, the steering wheel touch sensor 3, the side airbag 4 and the acceleration sensor 5 are the same as those in the first embodiment. The vehicle speed reduction device 6 is provided in a brake system of the vehicle C and reduces the speed of the vehicle in accordance with a signal from the ECU 1. The vehicle speed reduction device 6 corresponds to a vehicle speed reduction device. The ECU 1 makes determinations of the primary collision and the secondary collision in a manner similar to those in the first embodiment. At a time when the ECU 1 sets the second secondary-collision determination threshold as the collision determination threshold used for the secondary collision determination, the ECU 1 issues a startup signal to the vehicle speed reduction device 6. Upon receipt of the startup signal, the vehicle speed reduction device 6 starts brake control to reduce the vehicle speed.

In the occupant protection system of the present embodiment, the vehicle starts decelerating at the same time as the second secondary-collision determination threshold is set. As a result, the colliding speed in the secondary collision is reduced. The damage degree is further reduced.

Furthermore, because the vehicle speed reduction device 6 reduces the vehicle speed, occurrence of another accident is suppressed. For example, when the driver of the vehicle C involving the primary collision cannot maintain his posture, there is a fear that the vehicle movement may continue to bring about a new accident. However, in the present embodiment, because the vehicle speed reduction device 6 reduces the vehicle speed, it is possible to suppress a possibility that the vehicle C brings about a new collision (accident).

In the occupant protection system of each above described embodiment, when it is determined after the primary collision that the driver is gripping the steering wheel, the collision determination is performed using the first secondary-collision determination threshold. When it is determined after the primary collision that the driver is not gripping the steering wheel, the collision determination is performed using the second secondary-collision determination threshold. In the above, since the second secondary-collision determination threshold, which is set when it is determined the driver is not gripping the steering wheel, is smaller than the first secondary-collision determination threshold, the setting of the second secondary-collision determination threshold can finish the collision determination than the setting of the first secondary-collision determination threshold.

As a result, even when the driver cannot maintain his posture and cannot grid himself for the secondary collision nor operate the vehicle C to avoid the secondary collision, the occupant protection system of each above embodiment can advantageously reduce the damage degree of the driver.

(Modifications)

In the occupant protection system of the above embodiments, the steering wheel touch sensor 3 provided on the steering wheel H of the vehicle C is used as an occupant state detection device. However, the occupant state detection device is not limited to the sensor 3. Any device capable of detecting whether the posture of the occupant is maintainable can be used as the occupant state detection device. For example, the occupant state detection device may be a sensor provided on an arm rest of a vehicle (e.g., capacitive-type touch sensor, an infrared-type touch sensor), a device for detecting an occupant state by imaging a vehicle cabin, a device for detecting an occupant state by receiving a signal (e.g., radio wave, sound wave) from an occupant (e.g., a transmitter on an occupant), or the like. Furthermore, the sensors 2, 5, 10 are used as a sensor for detecting an impact at collision. However, type, total number, and the detection direction are not limited as long as a sensor can detect an impact at collision.

In the above occupant protection system, the ECU 1 performs the collision determination by comparing the integrated value of the detection signal of each sensor 2, 5, 10 with the determination threshold. Alternatively, processing other than integration may be performed on the detection signal of each sensor 2, 5, 10 and the processed signal may be compared with the determination threshold. Alternatively, the signal outputted from each sensor 2, 5, 10 may be directly compared with the determination threshold. Alternatively, processing such as inversion, amplification or the like may be performed on the output signal and the processed signal may be compared with the determination threshold.

In the above occupant protection system, the primary-collision determination threshold, the first secondary-collision determination threshold and the second secondary-collision determination threshold are predetermined. Alternatively, all or some of the determination thresholds may be calculated and determined based on the state of the vehicle C. Additionally, each determination threshold may have any form as along as it can be compared with the detection signal of the sensor 2, 5, 10 to perform the collision determination. For example, a determination threshold may be configured such that when the value obtained from the detection signal (e.g., the value of the processed signal) reaches (e.g., exceeds or falls below) the predetermined determination threshold, an occurrence of collision is determined. Alternatively, the value obtained from the detection signal goes out of a predetermined range (predetermined threshold range), an occurrence of collision may be determined.

In the above occupant protection system, the primary-collision determination threshold is used for determining the primary collision, and the first and second secondary-collision determination thresholds are used for determining the secondary collision. The primary-collision determination threshold may be different from or not different (same) from one of the first and second secondary-collision determination thresholds. When the primary-collision determination threshold has the same value of the one of the first and second secondary-collision determination threshold, a shared determination threshold can be used.

In the above occupant protection system, the side airbag 4 is used as a device for protecting an occupant after the collision determination. However, another device may be used alone or another device may be used in combination with the side airbag 4. A device for protecting an occupant may include an airbag such as a driver seat airbag, a front passenger airbag, curtain airbag and the like, and may include a seat pretensioner.

The vehicle speed reduction device 6 of the second embodiment is provided to a brake system. However, the vehicle speed reduction device 6 can be any device capable of reducing the vehicle speed. For example, the vehicle speed reduction device 6 may be device provided to an engine or a drive-train of a vehicle. These devices may be used in combination. Additionally, it may be preferable that the vehicle speed reduction device 6 reduce the vehicle speed until the stop of the vehicle.

In the above occupant protection system, the secondary collision is a collision occurring within the predetermined specific time period after the primary collision. However, the specific time period may be determined from the detection signal of each sensor 2, 5, and 10. For example, the specific time period may be a time period until convergence of the detection signal of the primary collision from each sensor 2, 5, 10, i.e., until the stop of the vehicle.

The above modifications can performs the collision determination in the primary collision and the secondary collision and protect the occupant like the above embodiment can. That is, the above modifications can have the same advantages as the above embodiments have.

What is claimed is:

1. An occupant protection system comprising:
    a sensor for detecting an impact at a time of collision of a vehicle, wherein the collision of the vehicle includes a primary-collision and a secondary-collision occurring due to movement of the vehicle resulting from the primary-collision;
    a determination device for determining the primary-collision by comparing a detection signal of the sensor with a primary-collision determination threshold; and
    an occupant state detection device for detecting whether a posture of an occupant of the vehicle is maintainable;
    wherein:
    for the secondary-collision occurring due to the movement of the vehicle resulting from the primary-collision, the determination device determines the secondary-collision;
    when the occupant state detection device detects that the posture of the occupant is maintainable after the determination device determines that the primary-collision has occurred, the determination device determines the secondary-collision by comparing the detection signal of the sensor with a first secondary-collision determination threshold; and
    when the occupant state detection device detects that the posture of the occupant is not maintainable after the determination device determines that the primary-collision has occurred, the determination device determines the secondary-collision by comparing the detection signal of the sensor with a second secondary-collision determination threshold smaller than the first secondary-collision determination threshold.

2. The occupant protection system according to claim 1, wherein:
    the secondary collision is defined as a collision occurring within a specific time period from the primary collision.

3. The occupant protection system according to claim 1, wherein:
    the occupant state detection device includes a touch sensing device provided on a steering wheel of the vehicle.

4. The occupant protection system according to claim 3, wherein:
    the touch sensing device detects whether the steering wheel is gripped;
    when the touch sensing device detects that the steering wheel is gripped, the occupant state detection device determines that the occupant is maintainable; and
    when the touch sensing device detects that the steering wheel is not gripped, the occupant state detection device determines that the posture of the occupant is not maintainable.

5. The occupant protection system according to claim 1, wherein:
    the sensor includes a main sensor and a safing sensor ensuring redundancy to the main sensor.

6. The occupant protection system according to claim 1, further comprising:
    a vehicle speed reduction device for reducing speed of the vehicle when the occupant state detection device determines that the occupant is not able to maintain the posture.

* * * * *